United States Patent
Soman et al.

(10) Patent No.: US 7,953,711 B2
(45) Date of Patent: May 31, 2011

(54) METHOD AND SYSTEM FOR HYBRID GARBAGE COLLECTION OF MULTI-TASKING SYSTEMS

(75) Inventors: Sunil Soman, Santa Barbara, CA (US); Laurent Philippe Daynes, Saint-Ismier (FR)

(73) Assignee: Oracle America, Inc., Redwood City, CA (US)

( * ) Notice: Subject to any disclaimer, the term of this patent is extended or adjusted under 35 U.S.C. 154(b) by 435 days.

(21) Appl. No.: 12/112,978

(22) Filed: Apr. 30, 2008

(65) Prior Publication Data
US 2009/0276478 A1 Nov. 5, 2009

(51) Int. Cl.
*G06F 7/00* (2006.01)
*G06F 17/00* (2006.01)
*G06F 12/00* (2006.01)

(52) U.S. Cl. .................. 707/693; 707/813; 707/816

(58) Field of Classification Search .................. 707/693, 707/696, 999.206, 813, 816, 817
See application file for complete search history.

(56) References Cited

U.S. PATENT DOCUMENTS

| | | | | |
|---|---|---|---|---|
| 5,687,368 A * | 11/1997 | Nilsen | ..... | 707/999.103 |
| 5,819,290 A * | 10/1998 | Fujita | ..... | 711/100 |
| 6,098,089 A * | 8/2000 | O'Connor et al. | ..... | 718/104 |
| 6,611,852 B1 * | 8/2003 | Morley et al. | ..... | 707/999.206 |

* cited by examiner

*Primary Examiner* — Vincent Boccio
(74) *Attorney, Agent, or Firm* — Osha • Liang LLP

(57) ABSTRACT

In general, the invention relates to a method for garbage collection. The method includes examining old regions to obtain a mark bitmap, a connectivity matrix, and fragmentation information, where the mark bitmap describes marked words and unmarked words for the old regions. The method further includes identifying a fragmented region in the old regions based on the fragmentation information, where the fragmented region includes at least one of the marked words. The method further includes copying the at least one of the marked words to a new region allocated from a pool of free regions, designating each of the unmarked words not in the fragmented region as free, adjusting a cross-region reference to the fragmented region in the marked words to point to the new region based on the connectivity matrix, and adding the fragmented region to the pool of free regions.

18 Claims, 7 Drawing Sheets

METHOD AND SYSTEM FOR HYBRID GARBAGE COLLECTION OF MULTI-TASKING SYSTEMS

BACKGROUND

In computer systems, garbage collection refers to automated memory reclamation. Specifically, a garbage collector is a process that differentiates between live objects (i.e, objects that are still in use) and dead objects (i.e., objects that are no longer in use). Differentiating between live objects and dead objects typically involves traversing a graph of live objects to identify objects that should not be discarded.

Once live objects are identified, the garbage collector frees memory occupied by dead objects, and the freed memory is then available for other uses. In contrast, manual memory reclamation requires software developers to write code to explicitly free memory when objects are no longer needed. Errors in manual memory reclamation code may result in unnecessarily large memory footprints, memory leaks, etc. Thus, garbage collection reduces the probability of such errors occurring.

Garbage collection may be used in many different operating environments. For example, garbage collection may be used in a multitasking environment. A task is a set of executable instructions loaded into memory, and multitasking refers to situations in which multiple tasks are loaded into memory simultaneously. Specifically, each task is an isolated unit of execution and generally cannot access objects associated with other tasks. If a computer system includes only a single processor, only a single task can execute at a time. Still, execution may transfer from one task to another. For example, execution may transfer if an executing task reaches a stopping point, if a pending task has higher priority, if a maximum execution time is reached for an executing task, etc. In multi-processor computer systems, tasks may execute on each processor concurrently.

SUMMARY

In general, the invention relates to a method for garbage collection. The method includes examining a number of old regions to obtain a mark bitmap, a connectivity matrix, and fragmentation information, where the mark bitmap describes a number of marked words for the number of old regions and a number of unmarked words for the number of old regions. The method further includes identifying a fragmented region in the number of old regions based on the fragmentation information, where the fragmented region includes at least one of the number of marked words. The method farther includes copying the at least one of the number of marked words to a new region allocated from a pool of free regions, designating each of the number of unmarked words not in the fragmented region as free, adjusting a cross-region reference to the fragmented region in the number of marked words to point to the new region based on the connectivity matrix, and adding the fragmented region to the pool of free regions.

In general, in one aspect, the invention relates to a system for garbage collection. The system includes an old generation pool including memory for use in an old generation of an application. The system further includes a garbage collector configured to examine a number of old regions in the old generation to obtain a mark bitmap, a connectivity matrix, and fragmentation information, where the mark bitmap describes a number of marked words for the number of old regions and a number of unmarked words for the number of old regions. The garbage collector is further configured to identify a fragmented region in the number of old regions based on the fragmentation information, where the fragmented region includes at least one of the number of marked words. The garbage collector is further configured to copy the at least one of the number of marked words to a new region allocated from a pool of free regions and designate each of the number of unmarked words not in the fragmented region as free.

In general, in one aspect, the invention relates to a computer readable medium embodying executable instructions for garbage collection in a multitasking environment, the executable instructions including instructions to examine a number of old regions to obtain a mark bitmap, a connectivity matrix, and fragmentation information, where the mark bitmap describes a number of marked words for the number of old regions and a number of unmarked words for the number of old regions. The executable instructions further include instructions to identify a fragmented region in the number of old regions based on the fragmentation information, where the fragmented region includes at least one of the number of marked words. The executable instructions further include instructions to copy the at least one of the number of marked words to a new region allocated from a pool of free regions, designate each of the number of unmarked words not in the fragmented region as free, adjust a cross-region reference to the fragmented region in the number of marked words to point to the new region based on the connectivity matrix, and add the fragmented region to the pool of free regions.

Other aspects of the invention will be apparent from the following description and the appended claims.

DETAILED DESCRIPTION

Figure 1:
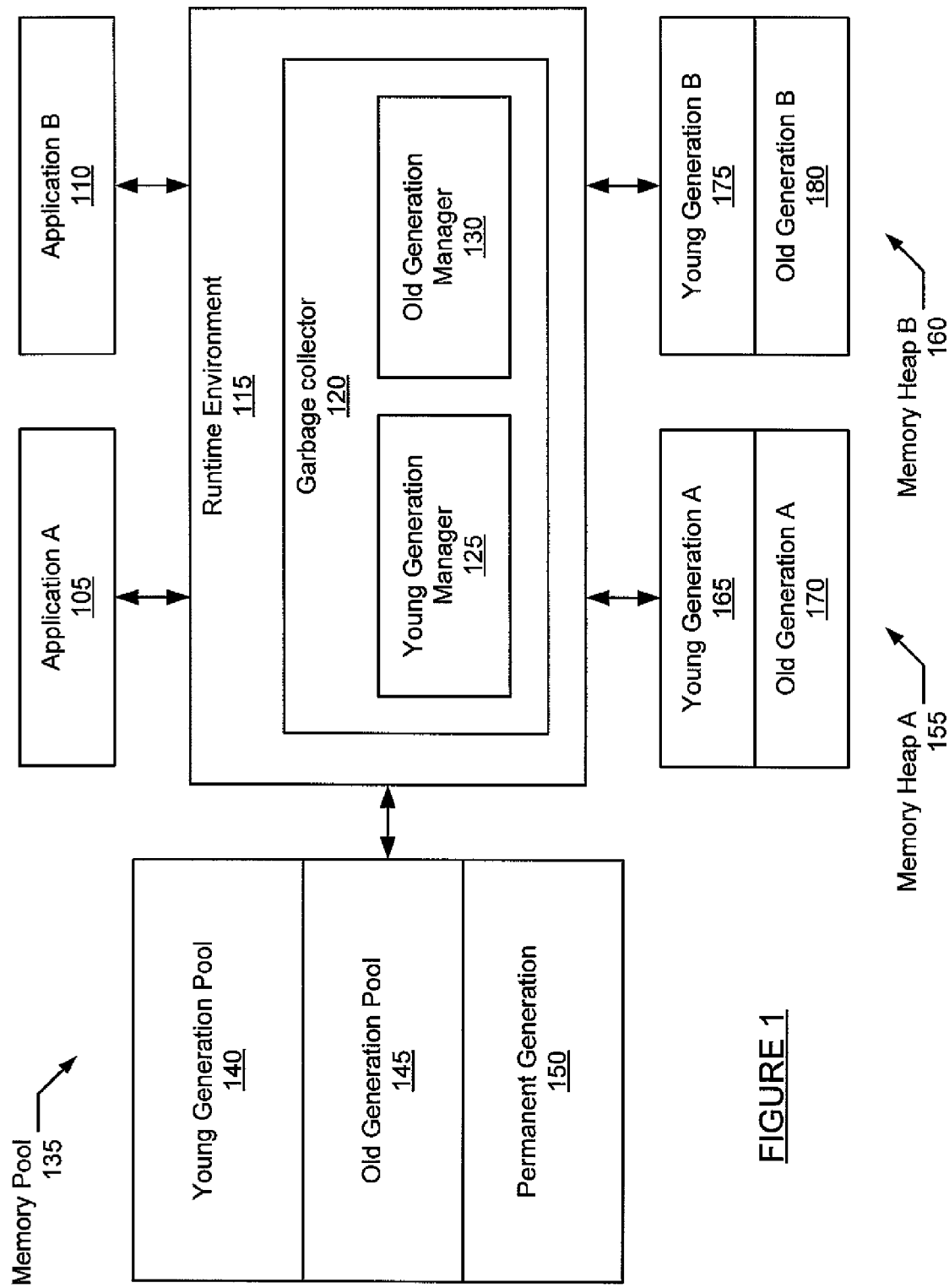
FIG. 1 shows a diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for hybrid garbage collection. More specifically, the hybrid garbage collection, in part, includes a mark-and-sweep approach for old regions of memory with little fragmentation and a selective evacuation of old regions of memory that are determined to be fragmented regions. In some embodiments of the invention, the evacuation of an old region corresponds to the copying of live objects from the old region to a new region, where the entire old region is then freed for use.

Furthermore, in some embodiments of the invention, memory of an old region freed with the mark-and-sweep approach is made available only to the application for which the old region was allocated. In contrast, memory freed by evacuating an old region may be made available to all applications. In this case, the combination of the mark-and-sweep approach and selective evacuation of old regions retains the benefits of both techniques (e.g., speed and efficiency of the mark-and-sweep approach, reduction of fragmentation by the selective evacuation approach) while minimizing their costs (e.g., the mark-and-sweep approach's inability to address fragmentation, the relatively high expense of performing an evacuation).

For ease of discussion, embodiments of the invention are discussed herein using a single old generation. However, those skilled in the art will appreciate that multiple old generations may exist. Specifically, in one or more embodiments, multiple old generations allow multiple levels of generational garbage collection. Accordingly, the scope of the invention should be not be considered limited to only a single old generation.

FIG. 1 shows a diagram of a system in accordance with one or more embodiments of the invention. A runtime environment (115) is configured to execute Application A (105) and Application B (110). Specifically, the runtime environment (115) may be a multi-tasking managed run-time environment configured to simultaneously execute multiple applications. Further, the runtime environment (115) may be a Java™ virtual machine, a Microsoft® NET framework, an operating system, or any other runtime environment that supports garbage collection. Application A (105) and Application B (110) may be any type of executable application configured to execute in the runtime environment (115). Java™ is a trademark of Sun Microsystems, Inc. located in Santa Clara, Calif. Microsoft® is a registered trademark of Microsoft Corporation located in Redmond, Wash.

In one or more embodiments of the invention, Application A (105) and Application B (110) are provided with respective memory heaps (155, 160). Specifically, the Application A (105) is configured to allocate memory from memory heap A (155), and the Application B (110) is configured to allocate memory from memory heap B (160). Further, the runtime environment (115) is configured to manage the memory pool (135) in order to allocate memory regions to the memory heaps (155, 160). The memory pool (135) may include random access memory (RAM), flash memory, any other type of rewritable computer storage, or any combination thereof.

In one or more embodiments of the invention, the memory pool (135) may include areas specific to generations in the memory heaps (155, 160). Specifically, the memory pool (135) may include a young generation pool (140) and an old generation pool (145). In this case, the runtime environment (115) is configured to allocate memory regions from the young generation pool (140) to young generation A (165) of memory heap A (155) and to young generation B (175) of memory heap B (160). Further, the runtime environment is configured to allocate memory regions from the old generation pool (145) to old generation A (170) of memory heap A (155) and to old generation B (180) of memory heap B (160).

Further, a portion of the memory pool (135) may be designated as a permanent generation (150), i.e., memory for allocating common objects shared by Application A (105) and Application B (110). The permanent generation (150) reduces the memory footprint when multiple applications are using the same objects. For example, objects storing runtime representations of classes and literal constant string values may be placed in the permanent generation (150). Those skilled in the art will appreciate that objects storing application-specific information are generally not placed in the permanent generation (150).

In one or more embodiments, the runtime environment (115) includes a garbage collector (120). Specifically, the garbage collector (120) includes one or more modules (e.g., threads, classes, functions, etc.) for performing garbage collection. For example, the garbage collector (120) may include a young generation manager (125) configured to manage allocation of memory to the young generations (165, 175). Further the garbage collector (120) may include an old generation manager (130) configured to manage allocation of memory to the old generations (170, 180). Those skilled in the art will appreciate that the garbage collector (120) may operate concurrently with the execution of applications (105, 110) in the runtime environment (115), where the runtime environment (115) is a multi-tasking managed run-time environment.

In one or more embodiments, the old generation pool (145) is a single contiguous region of memory, which is used to allocate old regions to memory heap(s) (155, 160). Old regions are smaller contiguous regions of memory within the old generation pool (145). Further, each old region of memory includes a number of words. Specifically, the memory heap (155, 160) of each application may be assigned an initial old region when the application starts, and more old regions may be added when objects are promoted from the young generation (165, 175) of the memory heap to the old generation (170, 180) of the memory heap during minor garbage collections. Those skilled in the art will appreciate that minor garbage collection may occur when memory can no longer be allocated from the young generation (165, 175). In this case, minor garbage collection transfers objects from the young generation (165, 175) to a corresponding old generation (170, 180) in order to create free space in the young generation (165, 175). Further, minor garbage collection may be performed based on the age of live objects in the young generations (165, 175). The age of a live object may correspond to the amount of time the live object remains in a young generation (165, 175) after a minor garbage collection. In this case, live objects may be transferred to old generations (170, 180) during minor garbage collection based on the age of the live objects.

In one or more embodiments of the invention, the old generation manager (130) is configured to scan the old generations (170, 180) to obtain data associated with the memory allocated to the old generations (170, 180). For example, the old generation manager (130) may be configured to scan the old generation A (170) to C obtain a mark bitmap, a connectivity matrix, and/or fragmentation information. The mark bitmap specifies whether each word in the old generation A (170) includes live objects. Specifically, the mark bitmap designates each word in a region as either pertaining to a live object (i.e., live data) or not pertaining a live object (i.e., dead space). The connectivity matrix specifies the old regions that include cross-region references to objects included in other old regions of the old generation A (170).

The old generation manager (130) may be configured to analyze the mark bitmap to obtain fragmentation information. Further, the fragmentation information may be associated with a specific old region of the old generation A (110). Examples of fragmentation information include, but are not limited to, the amount of dead space in the specific old region, amount of live data in the specific old region, and the number of areas in the specific old region that include dead space. In one or more embodiments of the invention, the old generation manager (130) may be configured to copy live data in an old region to a new region allocated from the old generation pool (145) based on the fragmentation information.

Figure 2:
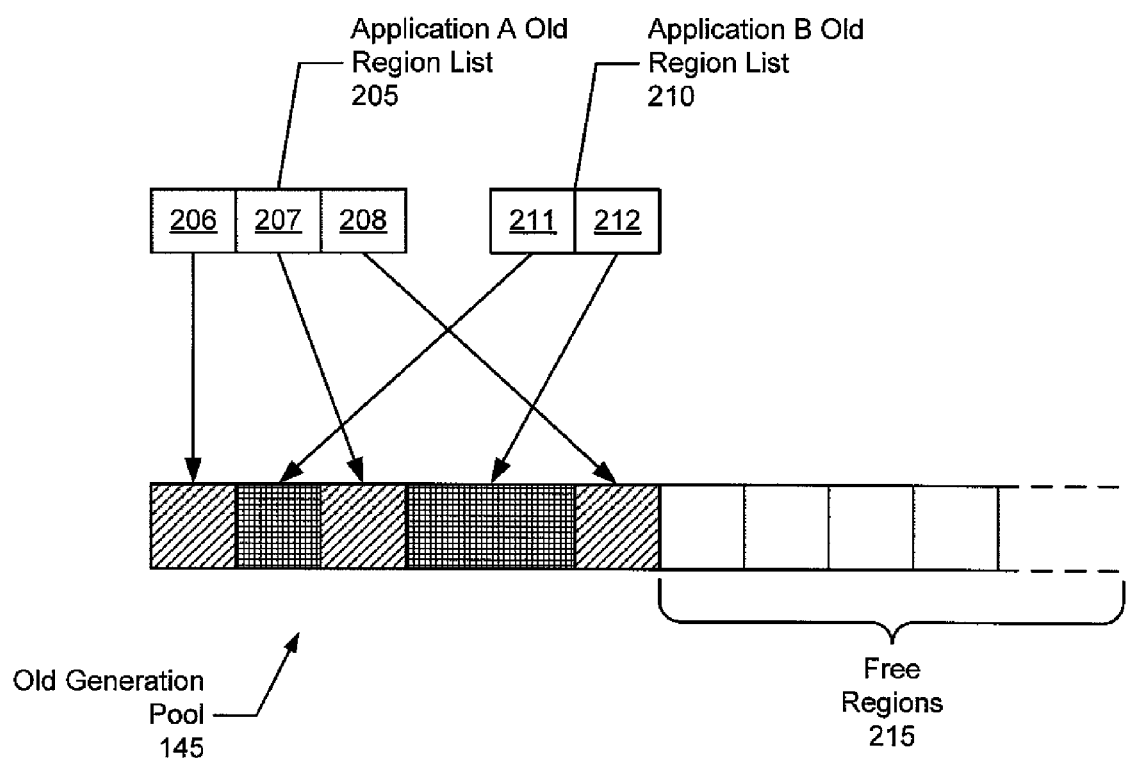
FIG. 2 shows a diagram of an old generation pool in accordance with one or more embodiments of the invention.

FIG. 2 shows a diagram of an old generation pool (145) in accordance with one or more embodiments of the invention. Specifically, an application A old region list (205) includes references to old regions for use by application A (206, 207, 208) allocated from the old generation pool (160). Further, an application B old region list (210) includes references to old regions for use by application B (211, 212) allocated from the old generation pool (160). In one or more embodiments of the invention, the old regions (206, 207, 208) referenced by the application A old region list (205) may only be accessed by application A. Similarly, the old regions (211, 212) referenced by the application B old region list (210) may only be accessed by application B. The old generation pool (160) also includes free regions (215), which may be allocated for use by any application.

In one or more embodiments of the invention, each application old region list (205, 210) references old regions including live objects for use by the corresponding application. Typically, once the old regions for an application become full, a new region from the free regions (215) may be allocated for use by the application. Further, an old region allocated for use by an application may be designated as a free region (215) after the live data in the old region is copied to a different region. For example, the live objects in an old region referenced by application A old region list (205) may be copied from the old region to a new region allocated from the free regions (215). Typically, any fragmentation occurring in the old region is addressed while copying the live data to the new region. In this example, after any references to the copied live data are updated, the new region may replace the old region in the application A old region list (205), and the old region may be designated as a free region (215).

Figure 3:
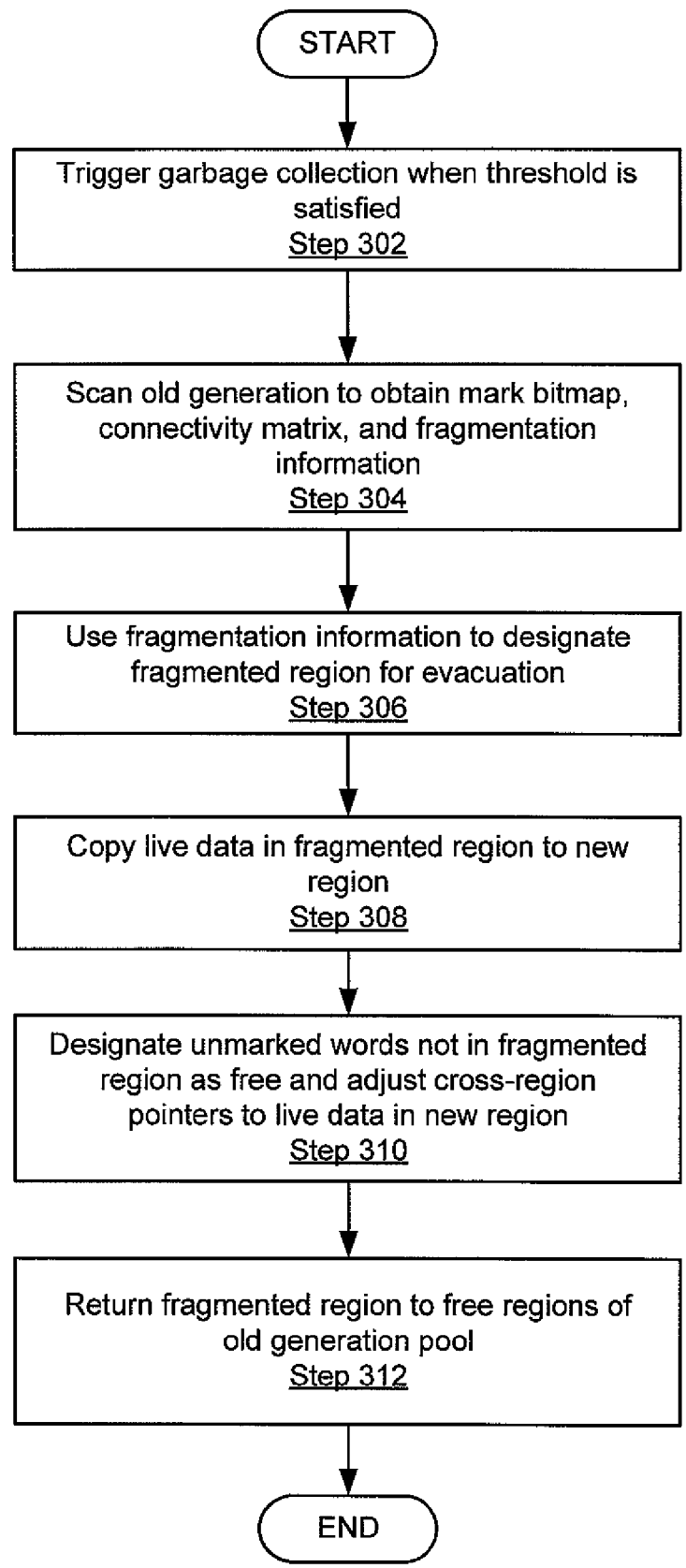
FIGS. 3-4 show flowcharts of a method for hybrid garbage collection in accordance with one or more embodiments of the invention.

FIG. 3 shows a flowchart of a method for hybrid garbage collection in accordance with one or more embodiments of the invention. In one or more embodiments, one or more of the steps shown in FIG. 3 may be omitted, repeated, and/or performed in a different order. Accordingly, the specific arrangement of steps shown in FIG. 3 should not be construed as limiting the scope of the invention.

Those skilled in the art will appreciate that the steps of FIG. 3 may be performed with respect to a memory heap of a particular application. In other words, the steps of FIG. 3 may be isolated to the memory allocated for use by the particular application. In the case of multiple applications, a hybrid garbage collection may be performed for each of the applications independently.

In Step 302, garbage collection is triggered when a threshold is satisfied. For example, garbage collection is triggered when the size of a memory heap for an application satisfies a specified size threshold. Those skilled in the art will appreciate that garbage collection may be triggered based on a variety of thresholds (e.g., availability of free regions in the old generation pool, size of memory heap for application, etc.) and that the threshold may be dynamically determined based on any number of conditions (e.g., processor usage, etc.). In one or more embodiments of the invention, garbage collection may also be manually triggered by an application.

In Step 304, the old generation of the application is scanned to obtain a mark bitmap, a connectivity matrix, and fragmentation information. In one or more embodiments of the invention, the old generation may be scanned as described below with respect to FIG. 4. As discussed above, the scanning of the old generation may be isolated to the memory allocated for use by this particular application. In this case, only old regions allocated to the old generation of the application are scanned to obtain the mark bitmap.

In Step 306, the fragmentation information is used to designate a fragmented region for evacuation. Examples of fragmentation information include, but are not limited to, the amount of dead space in an old region, amount of live data in the old region, and the number of areas in the old region that include dead space. In one or more embodiments of the invention, an old region is identified as a fragmented region based on the proportion of live data in the old region. For example, the old region may be designated as a fragmented region based on the following formula, $$\frac{\text{Live\_data}}{\text{Size\_of\_region}} < MinLiveRatio,$$

where MinLiveRatio is a specified threshold, Live_data is the aggregate size of live data in the old region, and Size_of_region is the size of the old region. Typically, the benefits of evacuation increase as the proportion of live data in a region decreases. Further, those skilled in the art will appreciate that the MinLiveRatio may be dynamically determined based on one or more conditions (e.g., availability of free regions in the old generation pool, etc.).

In one or more embodiments of the invention, an old region is identified as a fragmented region based on the average size of continuous dead space and the proportion of live data in the old region. For example, the old region may be designated as a fragmented region based on the following formula, $$\frac{\text{Size\_of\_region} - \text{Live\_data}}{\text{Num\_cont\_areas\_dead\_space}} < MinFragmentsSize \ \&\&$$

$$\frac{\text{Live\_data}}{\text{Size\_of\_region}} < MaxLiveRatio,$$

where MinFragmentSize is a specified threshold, Num_cont_areas_dead_space is the number of contiguous areas including dead space in the old region, and MaxLiveRatio is the proportion of live data in the old region that will prevent an evacuation despite the average size of continuous dead space (ie., the old region should only be identified as a fragmented region if the proportion of live data in the old region is less than MaxLiveRatio). Typically, the benefits of evacuation increase as the average size of continuous dead space in a region decreases. Further, those skilled in the art will appreciate that the MinFragmentSize and/or MaxLiveRatio may be dynamically determined based on one or more conditions (e.g., availability of free regions in the old generation pool, etc.).

In one or more embodiments of the invention, the specified thresholds for identifying a fragmented region may be specified by a user. For example, a user may configure the specified thresholds in a runtime environment (115 of FIG. 1) in order to optimize the execution of the application in the runtime environment.

Those skilled in the art will appreciate that multiple fragmented regions may be identified for an application. In this case, each of the fragmented regions may be evacuated as described in Steps 308-312. Alternatively, a subset of the fragmented regions may be selectively evacuated based on a variety of criteria (e.g., the number of cross-region references in a fragmented region, a maximum limit to the number of fragmented regions that may be evacuated in a single garbage collection run, etc.).

In Step 308, the live data in the fragmented region is copied to a new region. Initially, the new region is allocated for use by the application from an old generation pool. Optionally, in one or more embodiments of the invention, while copying the live data to the new region, the references included in the live data may be replaced with forwarding references to the copied live data in the new region. A forwarding reference is a placeholder reference in an evacuated region that designates the location of the copied live data in the new region.

In Step 310, the words referenced in the mark bitmap are scanned to sweep dead space and adjust cross-region references in live data. More specifically, unmarked words (i.e., dead space) not in the fragmented region are designated as free (i.e., the sweep step of a typical mark-and-sweep garbage collection approach), and, simultaneous or subsequent to the sweeping of the unmarked words, the marked words (i.e., live data) are processed to update the cross-region references to live data in the fragmented region to point to the copied live data in the new region. Those skilled in the art will appreciate that the cross-region references may be updated using the forwarding references generated in Step 308.

In one or more embodiments of the invention, the cross-region references in the marked words are updated based on the connectivity matrix. More specifically, the connectivity matrix may be used to identify old regions that include references to the fragmented region. The identified old regions may then be scanned to locate words holding forwarding references in the fragmented region. When a word holding a forwarding reference is located, the word may be updated to point directly to the destination of the forwarding reference. Alternatively, in one or more embodiments of the invention, all cross-region references in the old regions may be located earlier (e.g., in Step 304) in the workflow. For example, the cross-region references may be located during an earlier scan of the memory and stored for subsequent processing. In this example, the stored location information of all cross-region references may be used to update the cross-region references in the identified old regions without performing an additional scan of the identified old regions, thereby improving the efficiency of updating the cross-region references.

In addition, intra-region references in the new region and/or references from the young generation of the application to live data in the fragmented region may be updated to point to the copied live data in the new region. Those skilled in the art would appreciate that intra-region references in the live data of the fragmented region may require updating after the live data in the fragmented region is copied to the new region. For example, the intra-region references may require updating because the fragmentation of the fragmented region is addressed when copied to the new region.

In Step 312, the fragmented region may be returned to the old generation pool as a free region. The free region may then be allocated for use by any application. In contrast, the unmarked words swept free in Step 310 are only available for use by the application that is allocated the old region(s) including the unmarked words.

Figure 4:
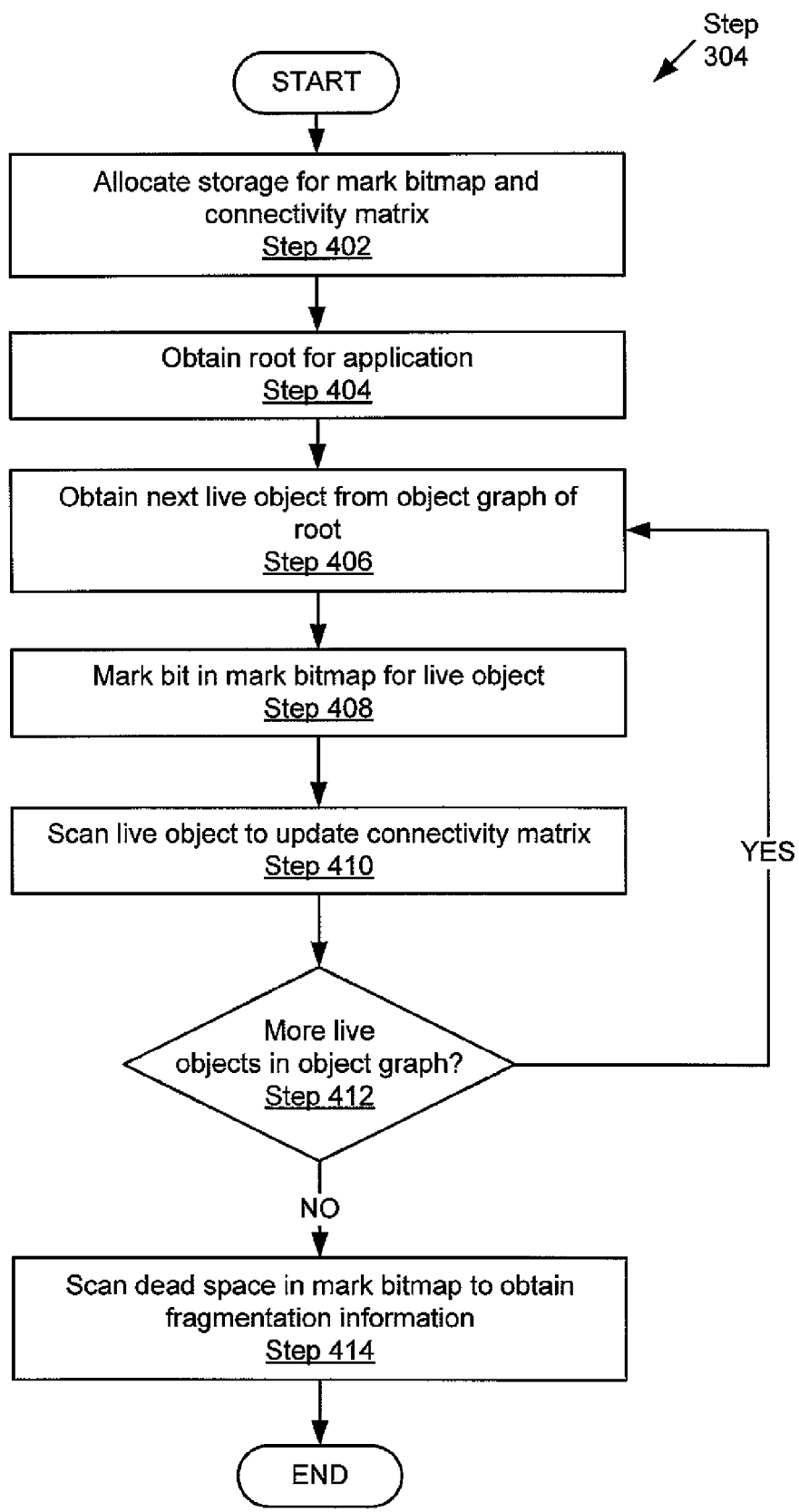

FIG. 4 shows a flowchart of a method for scanning the old generation of an application in accordance with one or more embodiments of the invention. In one or more embodiments, one or more of the steps shown in FIG. 4 may be omitted, repeated, and/or performed in a different order. Accordingly, the specific arrangement of steps shown in FIG. 4 should not be construed as limiting the scope of the invention.

In Step 402, storage is allocated for a mark bitmap and a connectivity matrix. More specifically, storage is allocated for storing the mark bitmap and the connectivity matrix of an application during garbage collection as described with respect to FIG. 3. The mark bitmap and the connectivity matrix are allocated based on the number of old regions allocated to the application. Further, each entry in the mark bitmap may be initialized as unmarked, and each entry in the connectivity matrix may be initialized as specifying no connection.

In Step 404, a root for the application is obtained. The root for the application is a reference to an object that is known to be a live object. For example, roots may be, but are not limited to, global variables, some other static data for the application, or the call stack. In one or more embodiments of the invention, the object graph for the application may be traversed using the root for the application. The object graph for the application includes all live objects that may be directly or indirectly referenced from the root (e.g., a root live object referenced by the root, the live objects referenced by the root live object, etc.).

In one or more embodiments of the invention, the root(s) of the application may be obtained from a task table stored in a permanent generation of the memory pool. The task table includes application-specific states for the application that may be retrieved based on the task identifier executing the application.

Those skilled in the art will appreciate that the application may have any number of roots that may be processed as described in Steps 404-412.

In Step 406, the next live object from the object graph of the root may be obtained. More specifically, the object graph for the root may be traversed to obtain the next live object in the object graph.

In Step 408, a bit for the live object is marked in the mark bitmap. More specifically, the bit(s) corresponding to the word(s) storing the live object are marked in the mark bitmap. Those skilled in the art will appreciate that any words that are not eventually marked in the mark bitmap would be designated as dead space.

In Step 410, the live object may be scanned to update the connectivity matrix. More specifically, the connectivity matrix may be updated based on cross-region references in the live object. Each reference in the live object may be analyzed to determine if the reference points to a referenced object not in the old region including the reference (i.e., a cross-region reference). If the reference is a cross-region reference, the connectivity matrix is updated to specify that the old region including the cross-region reference is connected to the old region including the referenced object. Optionally, in one or more embodiments of the invention, the location of the cross-region references may also be tracked for later use such as the one described in Step 310 of FIG. 3.

In one or more embodiments of the invention, references may be identified as cross-region references based on the size of the old region including the references. For example, if the old region size is a power of two and the old regions of the reference and referenced object are aligned, a reference may be identified as a cross-region reference using the following test:

```
to == *from;
if ((to ^ from) >> LOG_REGION_SIZE) != 0)
{
    // Is a cross-region reference
    Update_connectivity_matrix(to, from);
}
``` where LOG_REGION_SIZE is the size of the old region and from is the reference. In this example, if the test is unable to determine whether the reference is a cross-region reference, additional analysis of the reference may be performed to determine if the reference is a cross-region reference.

In one or more embodiments of the invention, the size of the old regions may be configured to minimize the occurrence of cross-region references. Typically, as the size of the old regions increases, the number of cross-region references decreases.

In Step 412, a determination is made regarding whether there is an additional live object in the object graph for the root. If there is an additional live object in the object graph, then Steps 406-410 are repeated for the additional live object. Further, those skilled in the art will appreciate that Steps 406-410 may be repeated for any number of live objects as the object graph is traversed. Alternatively, if there are is no additional live object in the object graph, the workflow proceeds to Step 414.

In Step 414, the mark bitmap is scanned to obtain fragmentation information. For example, the marked words of an old region may be scanned to determine the amount of live data in the old region. In another example, the unmarked words of an old region may be scanned to determine the number of contiguous areas including dead space in the old region. Those skilled in the art will appreciate that a variety of fragmentation information (e.g., amount of live data, number of contiguous areas including dead space, etc.) may be simultaneously obtained during a single scan of the mark bitmap.

Figure 5A:
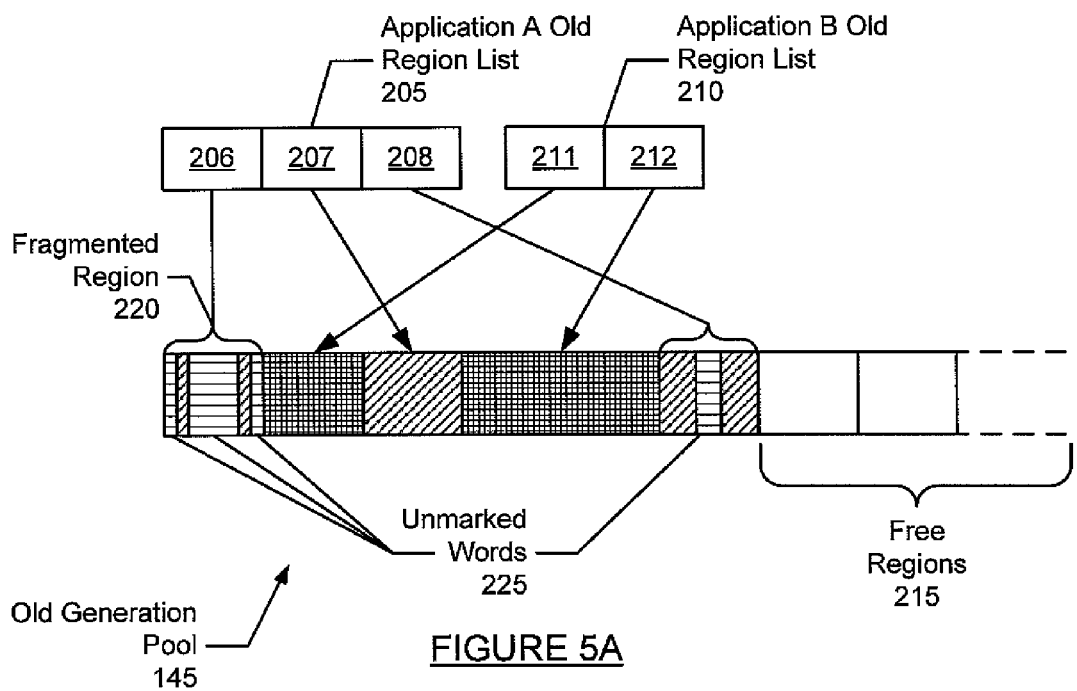
FIGS. 5A-5D show diagrams of an example of hybrid garbage collection in accordance with one or more embodiments of the invention.

FIGS. 5A-5D show examples in accordance with one or more embodiments of the invention. The examples are not intended to limit the scope of the invention. Turning to the example, FIG. 5A shows a diagram of an old generation pool (145) in accordance with one or more embodiments of the invention. In one or more embodiments of the invention, the old generation pool (145) corresponds to the old generation pool as shown in FIG. 2 after the Steps 304-306 are performed as discussed with respect to FIG. 3 for application A. Specifically, the old generation pool (145) shows the unmarked words (225) as specified in a mark bitmap generated for the application A (Step 304 of FIG. 3). The unmarked words (225) have been determined to not include live objects (i.e., are dead space).

Further, a first old region for application A (206) is designated as a fragmented region (220) (Step 306 of FIG. 3). The fragmented region (220) is designated based on the fragmentation of the first region of application A (206). More specifically, as described above with respect to FIG. 3, the fragmented region (220) may be designated based on (1) the proportion of live data in the first region of application A (206) and/or (2) the average size of continuous dead space in the first region of application A (206).

Figure 5B:
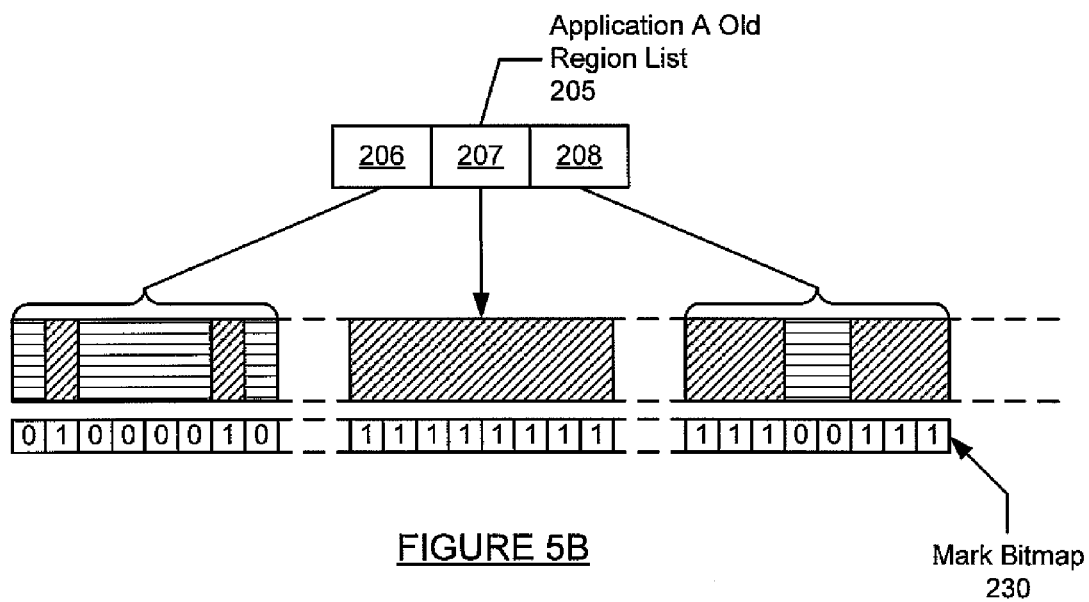

FIG. 5B shows a diagram of the mark bitmap (230) for the application A old region list (205). Those skilled in the art will appreciate that each region (206, 207, 208) may be of any size and may include any number of words. For example, each region may be 256 kilobytes and include 65,536 words, where each word is four bytes.

In this example, the proportion of live data in the first region of application A (206) is calculated as discussed in Step 306 of FIG. 3 as 0.25. If the MinLiveRatio in this example is 0.26, the first region of application A (206) is designated as a fragmented region based on the proportion of live data. Further, in this example, the average size of continuous dead space in the first region of application A (206) is calculated as discussed in Step 306 of FIG. 3 as 64 kilobytes. If the MinFragmentSize in this example is 50 kilobytes, the first region of application A (206) is not designated as a fragmented region based on the average size of continuous dead space. Those skilled in the art will appreciate that an old region may be designated as a fragmented region if either the MinLiveRatio or the MinFragmentSize threshold is satisfied.

In this example, the proportion of live data in the third region of application A (208) is calculated as discussed in Step 306 of FIG. 3 as 0.75. Further, the average size of continuous dead space in the third region of application A (208) is calculated as discussed in Step 306 of FIG. 3 as 64 kilobytes. In this case, neither either the MinLiveRatio or the MinFragmentSize is satisfied, and the third region of application A (208) is not designated as a fragmented region.

Figures 5C, 5D:
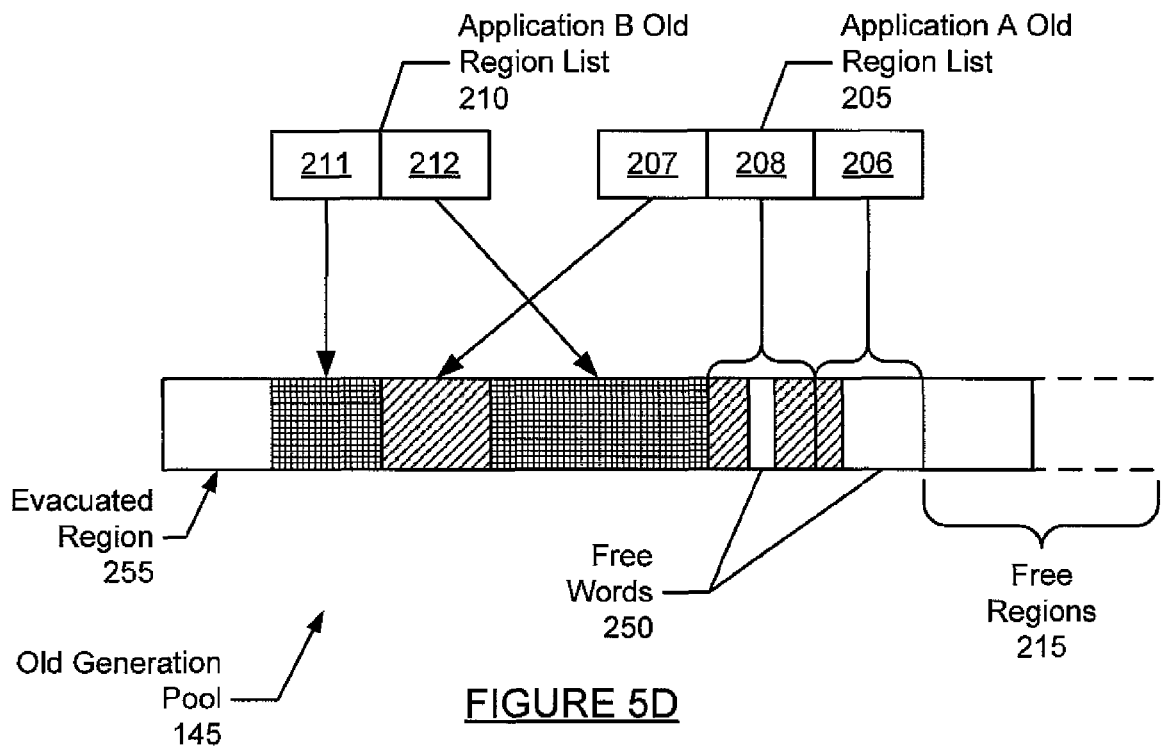

FIG. 5C shows a diagram of the connectivity matrix (235) for the application A old region list (205). More specifically, FIG. 5C shows a 3-by-3 matrix, where each entry of the matrix specifies if a "from" region (240) includes at least one reference to a "to" region (245) for application A. For example, the connectivity matrix (235) specifies that the second region of application A (207) includes at least one reference to the first region of application A (206) and at least one reference to the third region of application B (208). Further, the connectivity matrix (235) specifies that the third region of application A (208) includes at least one reference to the second region of application A (207).

In this example, the connectivity matrix (235) specifies that references of the second region of application A (207) will require updating when the first region of application A (206) is evacuated. More specifically, the connectivity (235) may be used as described in Step 310 of FIG. 3.

FIG. 5D shows a diagram of an old generation pool (145) in accordance with one or more embodiments of the invention. In one or more embodiments of the invention, the old generation pool (145) corresponds to the old generation pool as shown in FIG. 5A after the Steps 310-312 are performed as discussed with respect to FIG. 3 for application A. Specifically, the old generation pool (145) shows the words corresponding to the unmarked bits that were designated as free words (250). As described in Step 310 of FIG. 3, only the words corresponding to the unmarked bits not occurring in the fragmented region (220 of FIG. 5A) are designated as free words (250). In this case, the free words (250) are only available for use by the application A.

Further, the old generation pool (145) shows that the fragmented region (220 of FIG. 5A) was evacuated as described in Step 310 of FIG. 3 to obtain an evacuated region (255). As specified in the connectivity matrix as shown in FIG. 5C, the references in the second region of application A (207) are updated after the evacuation to point to a new region allocated for application A (206). Once the references are updated, the evacuated region (255) is returned to the pool of free regions (215) that may be allocated for use by any application.

In one or more embodiments of the invention, hybrid garbage collection provides improved garbage collection performance isolation in applications executing in a multi-tasking environment. More specifically, the hybrid garbage collection's combination of the mark-and-sweep and evacuation approaches provides flexibility when reclaiming memory. In the mark-and-sweep approach, memory may be reclaimed rapidly on a per-application basis. In the evacuation approach, memory may be reclaimed for all applications while also decreasing fragmentation. In other words, the efficiency of the mark-and-sweep approach increases the performance of an application while the evacuation approach decreases the memory footprint of the application when the benefits of doing so are maximized.

Figure 6:
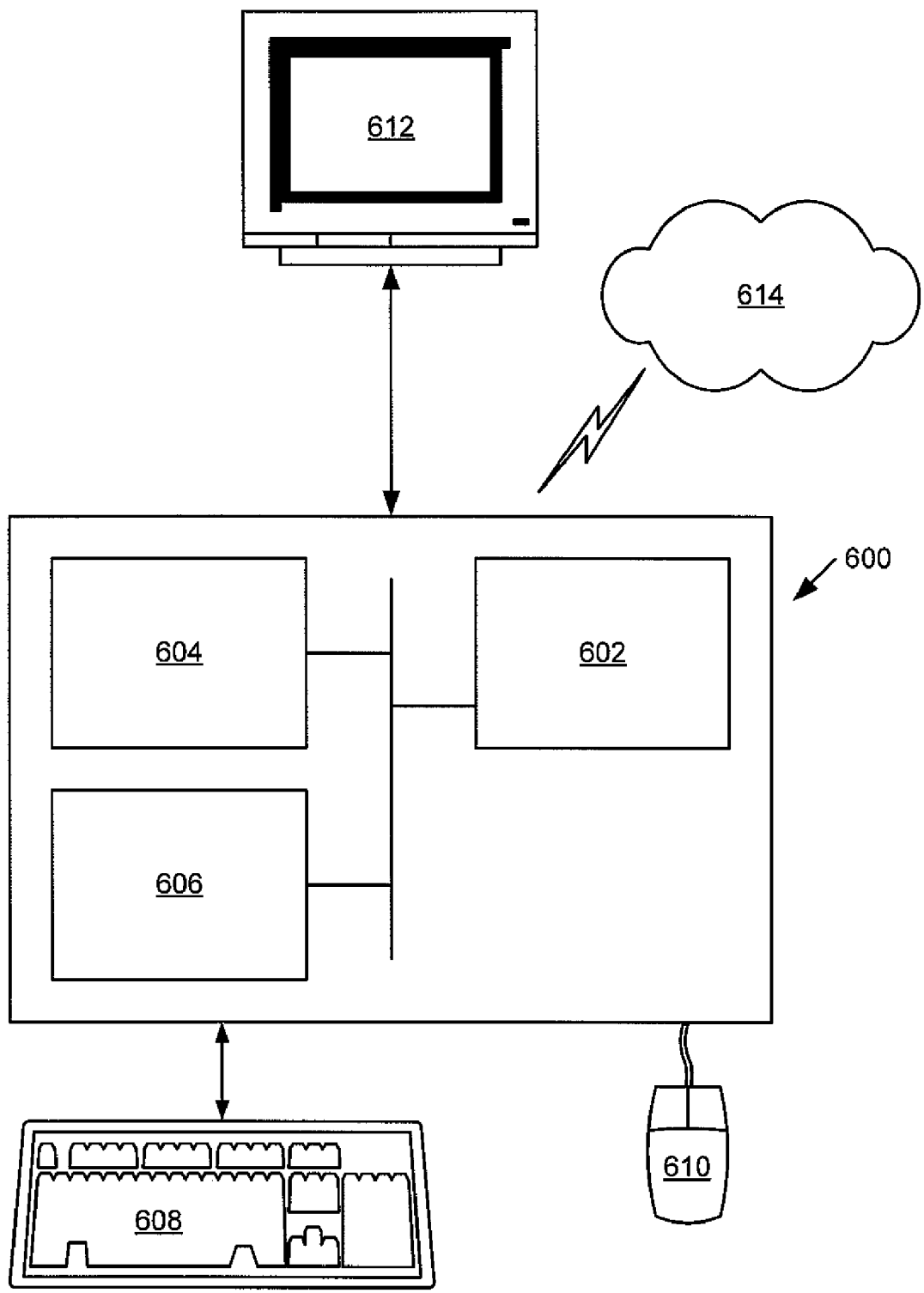
FIG. 6 shows a diagram of a computer system in accordance with one or more embodiments of the invention.

Embodiments of the invention may be implemented on virtually any type of computer regardless of the platform being used. For example, as shown in FIG. 6, a computer system (600) includes a processor (602), associated memory (604), a storage device (606), and numerous other elements and functionalities typical of today's computers (not shown). The computer (600) may also include input means, such as a keyboard (608) and a mouse (610), and output means, such as a monitor (612). The computer system (600) may be connected to a network (614) (e.g., a local area network (LAN), a wide area network (WAN) such as the Internet, or any other similar type of network) via a network interface connection (not shown). Those skilled in the art will appreciate that these input and output means may take other forms.

Further, those skilled in the art will appreciate that one or more elements of the aforementioned computer system (600) may be located at a remote location and connected to the other elements over a network. Further, embodiments of the invention may be implemented on a distributed system having a plurality of nodes, where each portion of the invention (e.g., application, runtime environment, garbage collector, young generation manager, old generation manager, memory pool, memory heap, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for garbage collection comprising:
    determining a plurality of old regions associated with an application;
    obtaining a root for the application, wherein the root is for traversing an object graph of live objects for the application;
    creating a mark bitmap by traversing the object graph using the root, wherein the mark bitmap describes a plurality of marked words for the plurality of old regions and a plurality of unmarked words for the plurality of old regions;
    creating a connectivity matrix by traversing the object graph using the root, wherein the connectivity matrix describes a plurality of cross-region references;
    scanning the mark bitmap to obtain fragmentation information;
    selecting a first region of the plurality of old regions;
    determining that the first region satisfies a fragmentation threshold using the fragmentation information;
    in response to determining that the first region satisfies the fragmentation threshold:
        copying at least one of the plurality of marked words located in the first region to a new region allocated from a pool of free regions;
        adjusting a cross-region reference to the first region in the plurality of marked words to point to the new region based on the connectivity matrix; and
        adding the first region to the pool of free regions;
    determining that a second region from the plurality of old regions does not satisfy the fragmentation threshold;
    in response to determining that the second region does not satisfy the fragmentation threshold, designating each of the plurality of unmarked words in the second region as free.

2. The method of claim 1, further comprising:
    after copying the at least one of the plurality of marked words to the new region, replacing the at least one of the plurality of marked words in the first region with a forwarding pointer to the new region.

3. The method of claim 2, wherein the cross-region reference is adjusted based on the forwarding pointer.

4. The method of claim 1, wherein an old generation of an application comprises the plurality of old regions, wherein the application is one of a plurality of applications.

5. The method of claim 4, wherein the each of the plurality of unmarked words in the second region are only available to the application, and wherein the first region added to the pool of free regions is available to each of the plurality of applications.

6. The method of claim 1, wherein determining that the first region satisfies the fragmentation threshold comprises determining that a proportion of live data in the first region satisfies the fragmentation threshold.

7. The method of claim 1, wherein determining that the first region satisfies the fragmentation threshold comprises determining that an average size of a continuous area of dead space in the first region and a proportion of live data in the first region satisfy the fragmentation threshold.

8. A system for garbage collection comprising:
    an old generation pool comprising memory for use in an old generation of an application;
    a garbage collector configured to:
        determine a plurality of old regions in the old generation
        obtain a root for the application, wherein the root is for traversing an object graph of live objects for the application;
        create a mark bitmap by traversing the object graph using the root, wherein the mark bitmap describes a plurality of marked words for the plurality of old regions and a plurality of unmarked words for the plurality of old regions;
        create a connectivity matrix by traversing the object graph using the root, wherein the connectivity matrix describes a plurality of cross-region references;
        scan the mark bitmap to obtain fragmentation information;
        select a first region of the plurality of old regions;
        determine that the first region satisfies a fragmentation threshold using the fragmentation information;
        in response to determining that the first region satisfies the fragmentation threshold:
            copy at least one of the plurality of marked words located in the first region to a new region allocated from a pool of free regions;

adjust a cross-region reference to the first region in the plurality of marked words to point to the new region based on the connectivity matrix; and add the first region to the pool of free regions;

determine that a second region from the plurality of old regions does not satisfy the fragmentation threshold;

in response to determining that the second region does not satisfy the fragmentation threshold, designate each of the plurality of unmarked words in the second region as free.

9. The system of claim 8, wherein the garbage collector is further configured to, after copying the at least one of the plurality of marked words to the new region, replace the at least one of the plurality of marked words in the first region with a forwarding pointer to the new region.

10. The system of claim 9, wherein the cross-region reference is adjusted based on the forwarding pointer.

11. The system of claim 8, wherein determining that the first region satisfies the fragmentation threshold comprises determining that a proportion of live data in the first region satisfies the fragmentation threshold.

12. The system of claim 8, wherein determining that the first region satisfies the fragmentation threshold comprises determining that an average size of a continuous area of dead space in the first region and a proportion of live data in the first region satisfy the fragmentation threshold.

13. The system of claim 8, wherein the each of the plurality of unmarked words not in the second region designated as free are only available to the application, wherein the first region added to the pool of free regions is available to each of a plurality of applications, and wherein the application is one of the plurality of applications.

14. A computer readable medium comprising executable instructions for garbage collection in a multitasking environment, wherein the executable instructions comprise instructions to:

determine a plurality of old regions associated with an application;

obtain a root for the application, wherein the root is for traversing an object graph of live objects for the application;

create a mark bitmap by traversing the object graph using the root, wherein the mark bitmap describes a plurality of marked words for the plurality of old regions and a plurality of unmarked words for the plurality of old regions;

create a connectivity matrix by traversing the object graph using the root, wherein the connectivity matrix describes a plurality of cross-region references;

scan the mark bitmap to obtain fragmentation information;

select a first region of the plurality of old regions;

determine that the first region satisfies a fragmentation threshold using the fragmentation information;

in response to determining that the first region satisfies the fragmentation threshold:

copy at least one of the plurality of marked words located in the first region to a new region allocated from a pool of free regions;

adjust a cross-region reference to the first region in the plurality of marked words to point to the new region based on the connectivity matrix; and add the first region to the pool of free regions;

determine that a second region from the plurality of old regions does not satisfy the fragmentation threshold;

in response to determining that the second region does not satisfy the fragmentation threshold, designate each of the plurality of unmarked words in the second region as free.

15. The computer readable medium of claim 14, wherein an old generation of the application comprises the plurality of old regions, wherein the application is one of a plurality of applications.

16. The computer readable medium of claim 15, wherein the each of the plurality of unmarked words not in the second region designated as free are only available to the application, and wherein the first region added to the pool of free regions is available to each of the plurality of applications.

17. The computer readable medium of claim 14, wherein determining that the first region satisfies the fragmentation threshold comprises determining that a proportion of live data in the first region satisfies the fragmentation threshold.

18. The computer readable medium of claim 14, wherein determining that the first region satisfies the fragmentation threshold comprises determining that an average size of a continuous area of dead space in the first region and a proportion of live data in the first region satisfy the fragmentation threshold.

* * * * *